US012496259B2

(12) United States Patent
Jang et al.

(10) Patent No.: US 12,496,259 B2
(45) Date of Patent: *Dec. 16, 2025

(54) SHEET-TYPE MASK GEL COMPOSITION, MASK SHEET COMPRISING THE SAME AND MANUFACTURING METHOD OF MASK SHEET

(71) Applicant: AMOREPACIFIC CORPORATION, Seoul (KR)

(72) Inventors: Jiwook Jang, Yongin-si (KR); Yanggyu Choi, Yongin-si (KR); Myoungwoo Kim, Yongin-si (KR); Jaemin Lim, Yongin-si (KR); Jua Jung, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 73 days.

This patent is subject to a terminal disclaimer.

(21) Appl. No.: 17/383,832

(22) Filed: Jul. 23, 2021

(65) Prior Publication Data
US 2022/0023159 A1  Jan. 27, 2022

(30) Foreign Application Priority Data

Jul. 24, 2020 (KR) ........................ 10-2020-0092590
Jun. 7, 2021 (KR) ........................ 10-2021-0073634

(51) Int. Cl.
*A61K 8/02* (2006.01)
*A61K 8/04* (2006.01)
*A61K 8/06* (2006.01)
*A61K 8/34* (2006.01)
*A61K 8/55* (2006.01)
*A61K 8/92* (2006.01)
*A61Q 19/02* (2006.01)
*A61Q 19/08* (2006.01)

(52) U.S. Cl.
CPC ............ *A61K 8/0212* (2013.01); *A61K 8/042* (2013.01); *A61K 8/06* (2013.01); *A61K 8/342* (2013.01); *A61K 8/553* (2013.01); *A61K 8/92* (2013.01); *A61Q 19/02* (2013.01); *A61Q 19/08* (2013.01); *A61K 2800/413* (2013.01); *A61K 2800/48* (2013.01); *A61K 2800/592* (2013.01); *A61K 2800/805* (2013.01)

(58) Field of Classification Search
None
See application file for complete search history.

(56) References Cited

U.S. PATENT DOCUMENTS 5,980,925 A * 11/1999 Jampani ............... A61K 9/0014
424/404
6,432,428 B1 * 8/2002 Arquette ................. C07C 67/03
424/59

2006/0104931 A1    5/2006  Fukutome et al.
2016/0015619 A1    1/2016  Lee
2018/0303726 A1 * 10/2018  Hessler .................... A61L 15/44
2019/0345336 A1 * 11/2019  Addy ........................ C08K 5/01

FOREIGN PATENT DOCUMENTS

| CN | 105476867 A | | 4/2016 | |
| CN | 111372551 A | * | 7/2020 | ............ A61K 47/10 |
| CN | 111419773 A | * | 7/2020 | ........... A61K 36/185 |
| JP | 2000226325 A | * | 8/2000 | .......... A61K 8/0208 |
| JP | 2005-97124 A | | 4/2005 | |
| KR | 10-2012-0054906 A | | 5/2012 | |
| KR | 20140106930 A | * | 11/2014 | ............ A61K 47/42 |
| KR | 10-1497040 B1 | | 3/2015 | |
| KR | 10-1497653 B1 | | 3/2015 | |
| KR | 10-2015-0125669 A | | 11/2015 | |
| KR | 10-2016-0081382 A | | 7/2016 | |
| KR | 10-1770556 B1 | | 8/2017 | |
| KR | 10-2018-0027858 A | | 3/2018 | |
| KR | 10-2018-0050335 A | | 5/2018 | |
| KR | 20200049334 A | * | 5/2020 | ............ A61K 8/345 |
| WO | WO-2008040303 A1 | * | 4/2008 | ........... A61K 31/164 |
| WO | WO-2015012424 A1 | * | 1/2015 | ........... A61K 8/0212 |
| WO | WO-2019146783 A1 | * | 8/2019 | ............ A61K 8/29 |
| WO | WO-2020067591 A1 | * | 4/2020 | |

OTHER PUBLICATIONS

Lipoid, Soybean Phospholipids & Formulations, https://lipoid.com/en/products/raw-material-sources/soybean-phospholipids-formulations/; accessed Dec. 16, 2022 (Year: 2022).*
Sigma Aldrich, L-α-Phosphatidylcholine, hydrogenated, https://www.sigmaaldrich.com/US/en/product/sigma/p4139; accessed Dec. 20, 2022 (Year: 2022).*
Oliphant et al., Effect of Jojoba Esters on Skin Barrier Function, Skin Hydration, and Consumer Preference, https://www.floratech.com/PDFs/Articles_MKT/ART06.pdf; accessed Dec. 20, 2022; published 2013 (Year: 2013).*
Wikipedia, Jojoba ester, https://en.wikipedia.org/wiki/Jojoba_ester; accessed Dec. 16, 2022 (Year: 2022).*
Fifty Shades of Snail, Reader Questions: Why I Use Sheet Masks After Serums, https://fiftyshadesofsnail.com/2016/12/05/reader-questions-why-i-use-sheet-masks-after-serums/; accessed Dec. 23, 2022; archived via Wayback Machine Dec. 21, 2016 (Year: 2016).*
Dermovia, Lace Your Face Calming Chamomile, https://www.dermovia.com/products/calming-chamomile-face-mask; accessed Dec. 23, 2022 (Year: 2022).*

(Continued)

*Primary Examiner* — Bethany P Barham
*Assistant Examiner* — Judith Marie Kamm
(74) *Attorney, Agent, or Firm* — Sughrue Mion, PLLC

(57) ABSTRACT

Disclosed are a sheet-type mask gel composition, mask sheet including the same and a method of manufacturing the mask sheet. The sheet-type mask gel composition includes an emulsion composition, a polyol, and a thickener, wherein the emulsion composition includes at least one selected from butters, oils, waxes, and a combination thereof, a surfactant and a polyol.

13 Claims, 16 Drawing Sheets

(56) References Cited

OTHER PUBLICATIONS

Dermaviduals, Nanoparticles in cosmetic products—good or bad?, https://dermaviduals.de/english/publications/special-actives/nanoparticles-in-cosmetic-products-good-or-bad.html; accessed Dec. 20, 2022; archived via Wayback Machine Sep. 21, 2010 (Year: 2010).*

Cornier et al., Nanocosmetics: From Ideas to Products, 2019, Springer Nature Switzerland, 1, 97-140 (Year: 2019).*

Revolve, The Vital Vita 12 Amouple and Mask Set, https://www.revolve.com/tonymoly-the-vital-vita-12-ampoule-and-mask-set/dp/TYMO-WU51/; accessed Dec. 16, 2022; product reviewed by consumer Jun. 23, 2019 (Year: 2019).*

Yukuyama et al. "Nanoemulsion: process selection and application in cosmetics-a review" International Journal of Cosmetic Science, 2016, 38, 13-24 (Year: 2016).*

* cited by examiner before use after use

SHEET-TYPE MASK GEL COMPOSITION, MASK SHEET COMPRISING THE SAME AND MANUFACTURING METHOD OF MASK SHEET

CROSS-REFERENCE TO RELATED APPLICATIONS

This application claims priority to and the benefit of Korean Patent Application No. 10-2020-0092590 filed in the Korean Intellectual Property Office on Jul. 24, 2020 and the benefit of Korean Patent Application No. 10-2021-0073634 filed in the Korean Intellectual Property Office on Jun. 7, 2021, the entire contents of which are incorporated herein by reference.

BACKGROUND

(a) Field of the Invention

This disclosure relates to a sheet-type mask gel composition, a mask sheet including the same, and a manufacturing method of the mask sheet.

(b) Description of the Related Art

Human skin plays a fundamental role in protecting various parts of a body from external stimuli, and also conducts important functions of making a person stand out by expressing clean and bright skin or clear and soft skin through skin care or making the skin healthy. In such skin care, particularly, since an exposed area such as a face, a neck, or the like is a channel for active personal expression to the outside, the demand for skin care products such as mask sheets is rapidly increasing.

Such a cosmetic mask sheet is manufactured by adding a face lotion or functional ingredients to a base sheet to impart efficacy of relieving tension of the skin, moisturizing the skin, improving elasticity, relieving wrinkles, removing waste and adsorbed contaminants on the skin surface, eliminating excessive sebum, promoting slipperiness, providing psychological stability, supplying nutrients, and the like. Since this is in line with a human desire of keeping clean and healthy skin, the mask sheet market is gradually growing, and in addition, as concerns about skin damage due to environmental pollutants draw attention, the market size is more rapidly growing in recent years.

Above all, in recent years, in order to improve moisture retention, a hydrogel mask sheet having a three-dimensional hydrophilic polymer network has been gaining popularity. However, the hydrogel mask sheet is water-phased and thus is not suitable for delivering oil-soluble active ingredients, and in addition, it includes a large amount of moisture and thus is vulnerable to microbial contamination, and above all, is not easily adhered to the skin due to low gel adhesiveness and thus insufficiently delivers the active ingredients to the skin. In particular, with the recent development of layering skin care or layered make-up, a cosmetic method of first applying a water-soluble/oil-soluble composition such as a cream or an essence to bare skin and then attaching the mask sheet instead of simply attaching the mask sheet to the bare skin is becoming more and more popular, but since all conventional mask sheets exhibit significantly-decreased adhesive strength to the skin on which the cream or essence is applied, almost all of the mask sheets currently available on the market may not be suitable for the layering skin care. Furthermore, if the mask sheets are attached to the skin immediately after being opened, there is no problem, but if the mask sheets are attached to the skin after a certain period of time, there may be a problem of not delivering the active ingredients contained therein to the skin because of evaporation of moisture in the mask sheets. Most of the mask sheets currently available on the market quickly dry out when left at room temperature even for a little while and thus may not fully function as a mask sheet.

In addition, when butters, oils, waxes, etc. are supported in a high content on the mask sheet in order to deliver active ingredients to the skin well, the butters, oils, waxes, etc. may be out of the sheet during distribution of the mask sheet. Therefore, the active ingredients such as butters, oils, and waxes should be usually supported in a small amount on the mask sheet.

Therefore, development of a mask sheet having a new composition capable of solving such problems is required.

SUMMARY

An embodiment provides a sheet-type mask gel composition that can support higher content of butters, oils, and waxes than conventional mask sheets, has excellent adhesive strength, has excellent moisturizing ability even after removing the mask sheet from the skin, and is applicable to mask sheet layering beauty methods, a mask sheet including the same, and a method for manufacturing the mask sheet.

According to an embodiment, a sheet-type mask gel composition includes an emulsion composition, a polyol, and a thickener, wherein the emulsion composition is 'at least one selected from butters, oils, waxes, and a combination thereof,' 'a surfactant' and 'a polyol.'

The surfactant may include two or more fatty acids.

The surfactant including two or more fatty acids may include lecithin.

The emulsion composition may further include an aliphatic alcohol.

The aliphatic alcohol may be a compound having 16 or 18 to 22 carbon atoms.

For example, the emulsion composition may further include cetearyl alcohol and/or behenyl alcohol in addition to lecithin, which is the surfactant including the two or more fatty acids.

The oils may have low compatibility with the polyol.

The oils having low compatibility with the polyol may include at least one selected from the ester oils, hydrocarbon oils, and silicone oils.

The polyol may be included in an amount of about 50 wt % to about 80 wt %, and at least one selected from butters, oils, waxes, and combinations thereof may be included in an amount of about 1 wt % to about 40 wt %, and the surfactant may be included in an amount of about 0.1 wt % to about 20 wt % based on the total amount of the emulsion composition.

At least one selected from butters, oils, waxes, and a combination thereof may be included in an amount greater than that of the surfactant.

The emulsion composition may have a lamellar structure.

The emulsion composition may be diluted in water, and the emulsion composition diluted in water may be composed of particles having an average particle diameter of about 300 nm to about 400 nm.

The polyol may be included in an amount of about 49 wt % to about 90 wt %, the emulsion composition may be included in an amount of about 5 wt % to about 50 wt %, and the thickener may be included in an amount of about 1 wt % to about 10 wt % based on the total amount of the sheet-type mask gel composition.

The emulsion composition may be included in an amount greater than that of the thickener.

The polyol may include glycerin, 1,3-butanediol, propylene glycol, polyethylene glycol, dipropylene glycol, propanediol, or a combination thereof.

The thickener may include xanthan gum, hyaluronic acid, carboxymethylcellulose, polyacrylate carboxymethyl starch, carboxymethyl chitosan, carboxymethyl dextran, or a combination thereof.

The sheet-type mask gel composition may satisfy Equation 1:

$$100-(B/A\times100)<10 \qquad [\text{Equation 1}]$$

wherein, A is a weight immediately after arbitrary processing of the gel obtained by gelling the gel composition to 5 cm×5 cm×1 mm, and B is a weight immediately after drying the gel immediately after the above arbitrary processing at 45° C. for 60 minutes.

The sheet-type mask gel composition may have a higher adhesive strength when the water-soluble or oil-soluble composition is applied to the skin of a mammal and then the sheet-type mask gel composition is subsequently applied, rather than when the sheet-type mask gel composition is directly applied alone to the skin of a mammal.

The sheet-type mask gel composition may further include a wrinkle-improving material, a whitening material, a skin trouble-improving material, or a combination thereof.

The sheet-type mask gel composition may further include an inorganic material.

The inorganic material may include titania (titanium dioxide), zinc oxide, sulfur, calamine, clay, or a combination thereof.

The inorganic material may be included in an amount of greater than or equal to about 0.01 wt % relative to the total amount of the gel composition.

The sheet-type mask gel composition may have an adhesive strength of greater than or equal to about 30 g/cm$^2$.

According to another embodiment, a mask sheet including the sheet-type mask gel composition is provided. The mask sheet may have a support attached to any one surface of the mask sheet.

The support may be a non-woven fabric made of fibers of recycled fibers such as cotton, rayon, etc., elastic polyurethane, acetate, wool, an ester-based material including polyethylene glycol terephthalate, etc., and polyethylene, nylon, polypropylene, or a combination thereof, a woven fabric, oriented polypropylene, casting polypropylene, high-density polyethylene, low-density polyethylene, linear low-density polyethylene, or a support in which the aforementioned material is laminated on a non-woven fabric in the form of a film.

The mask sheet may include a release film attached to the other surface of the mask sheet to which the support is attached.

The release film may be any release film or laminates thereof commonly used in transdermal formulations such as mask packs, and may be, for example, a film such as polypropylene, polyethylene, polyester, polyvinyl chloride, polyvinylidene chloride, etc., or paper on which the aforementioned materials are laminated.

The mask sheet may be an eye mask sheet.

The mask sheet may perform a function such as blue light blocking, trouble care, and sebum absorption.

According to another embodiment, a method of manufacturing the mask sheet includes emulsifying at least one selected from butters, oils, waxes, and a combination thereof, a surfactant, and a polyol to prepare an emulsion composition; stirring the emulsion composition with a polyol and a thickener, and uniformly coating the stirred material on a release film; uniformly coating the stirred material on a release film and then heating and cooling to gel; and attaching a support to the surface on which the stirred material is gelled to manufacture g a mask sheet.

The method for manufacturing the mask sheet may further include aging the gel attached to the support.

The heating may be performed at a temperature of about 70° C. to about 120° C. for about 2 minutes to about 30 minutes.

The stirring of the emulsion composition with the polyol and the thickener may be stirring the emulsion composition together with the polyol, the thickener and 'a wrinkle-improving material, a whitening material, a skin trouble-improving material, or a combination thereof.'

The mask sheet according to one aspect of the present disclosure has excellent moisture retention ability for the skin even after it is detached, and even if a high content of butters, oils, waxes, etc. is supported, the butters, oils, waxes, etc. are well out of the mask sheet during distribution. Even when the mask sheet is attached to the skin and the butters, oils, waxes, etc. are released to the skin, the adhesive strength of the mask sheet to the skin does not decrease significantly, so there is no inconvenience such as the mask sheet falling off the skin during use.

DETAILED DESCRIPTION OF THE EMBODIMENTS

Figure 1:
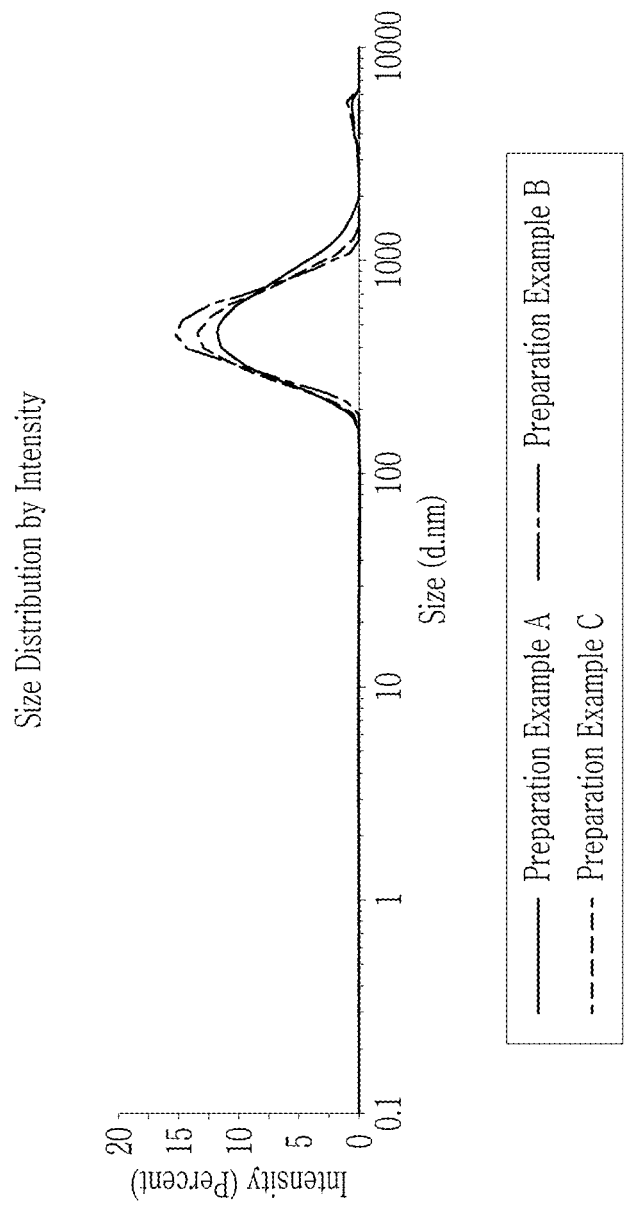
FIG. 1 is a graph showing the particle size of the particles constituting the emulsion compositions of Preparation Example 1 to Preparation Example 3.

Hereinafter, embodiments of one aspect of the present disclosure will be described in detail so that those skilled in the art to which one aspect of the present disclosure pertains could easily practice. However, this disclosure may be embodied in many different forms and is not construed as limited to the example embodiments set forth herein.

The terms used in this specification are terms defined in consideration of functions in one aspect of the present disclosure, which may vary depending on the intention or custom of the user or operator, and thus the definition should be based on the overall content defined in this specification describing the "mask sheet" according to one aspect of the present disclosure.

It will be understood that when an element such as a layer, film, region, or substrate is referred to as being "on" another element, it may be directly on the other element or intervening elements may also be present. In contrast, when an element is referred to as being "directly on" another element, there are no intervening elements present.

In the present specification, the term "maintaining adhesive strength" means that when a gel composition or a mask sheet is attached to the skin of a mammal such as a human, the gel composition or the mask sheet does not come off the skin to which the gel composition or the mask sheet is attached, and even after holding for a certain period of time, for example, greater than or equal to about 30 minutes, for example greater than or equal to about 1 hour, for example greater than or equal to about 2 hours, for example greater than or equal to about 3 hours, desirably for example greater than or equal to about 4 hours, for example greater than or equal to about 5 hours, for example greater than or equal to about 6 hours, for example greater than or equal to about 7 hours, for example greater than or equal to about 8 hours, for example greater than or equal to about 9 hours, for example greater than or equal to about 10 hours, for example greater than or equal to about 11 hours, for example greater than or equal to about 12 hours, or for example greater than or equal to about 24 hours after the gel composition or the mask sheet is attached to the skin at the same time, the gel composition or the mask sheet does not come off the skin to which the gel composition or the mask sheet is attached.

Specifically, in the present specification, maintaining the adhesive strength means that when a gel composition or a mask sheet is attached to the skin of a mammal such as a human (adhesive area 100%), the gel composition or the mask sheet does not come off from the attached skin, and at the same time It means that 70% or more of the adhesive area of the gel composition or mask sheet is maintained even after greater than or equal to about 30 minutes, more specifically greater than or equal to about 4 hours, after the gel composition or mask sheet is attached to the skin.

In the present specification, the blue light may mean a blue-based visible light having a wavelength of about 380 nm to about 550 nm.

Hereinafter, a sheet-type mask gel composition according to an embodiment is described.

A hydrogel mask sheet has been developed and widely used to date to compensate for the problems of the conventional nonwoven mask sheet. Since the hydrogel contains a large amount of water, its physical properties are weak, there is a risk of microbial contamination, and there are many difficulties in the manufacture of products using this.

Specifically, the hydrogel mask sheet is manufactured using a composition in which a hydrophilic polymer is added to water together with other raw materials or a composition in which the hydrophilic polymer is mixed in an aqueous solution to which other raw materials are added. These compositions generally form a crosslinked structure, but the durability of the crosslinked structure is weak, and thus there is a problem in that the physical properties of the finally manufactured mask sheet, in particular, elongation or tensile strength are lowered. In addition, a separate additive has been added to strengthen the durability of the crosslinked structure. In this case, the additive has a detrimental effect on the skin or made it impossible to manufacture the mask sheet due to a change in the viscosity of the composition. In addition, since the hydrogel mask sheet contains an excessive amount of water, there is always a concern of microbial contamination, and when left at room temperature, there is a problem that the mask sheet dries quickly. Accordingly, consumers' demand has been currently increasing for a mask sheet differentiated from the conventional hydrogel mask sheet. Furthermore, recently, a layering cosmetic method has been spotlighted. In addition to the hydrogel mask sheet, all of the conventional mask sheets have physical properties that are not suitable for application to the layering cosmetic method. The layering cosmetic method refers to a makeup method in which several types of compositions or sheets are sequentially applied to the skin over time. Therefore, in the prior art, it is a general method of using a mask sheet to apply the mask sheet directly to the bare skin. According to a recent layering cosmetic method, by applying a composition (cream or essence, etc.) of a water-soluble or oil-soluble component to the skin, and then attaching a mask sheet, active ingredients in the mask sheet are added to the cream or essence, resulting in implement of a synergistic effect (e.g., functional improvement such as wrinkles and whitening within a short time). However, in order to apply the layering cosmetic method, the mask sheet must have excellent adhesive strength even when applied to the skin to which the cream or essence has been applied. However, all of the hydrogel mask sheets known to date have a physical property of lowering adhesive strength when applying a layering cosmetic method.

In other words, various products (toners, emulsions, creams, etc.) for skin care are currently being widely used. In a situation where the needs for new customer experiences and cosmetic methods continue to increase, the conventional hydrogel mask sheet containing a large amount of moisture with acrylic acid as a main component is insufficient to meet new customer needs.

In addition, most of the mask sheet products on the market, not hydrogel, which show excellent adhesive strength, are oil gel formulations using a hydrophobic adhesive base or silicone gel types using silicone materials. Mask sheets of this formulation also have excellent adhesive strength to bare skin, but do not have enough adhesive strength to skin applied with toner, emulsion, or cream, and thus they fall off easily, and are difficult to attach for a long time. Therefore, there is a limit to the essential role of a mask sheet that must sufficiently deliver the active ingredient to the skin. In addition, in oil gel formulations, hydrophilic components such as polyols are sufficiently blended when used, and oils are out by hydrophilic components such as polyols over time. As time goes by, the adhesive strength is greatly reduced, and in most cases, a problem occurs in the feeling of use. That is, most of the mask sheet products on the market other than the hydrogel, which show excellent adhesive strength, have excellent initial adhesive strength, but do not ensure that excellent adhesive strength is continuously maintained during use.

However, since the sheet-type mask gel composition according to an embodiment uses a polyol and a thickener as a base, and the polyol and the thickener are stirred together after first preparing an emulsion composition, the gel composition exhibits such excellent adhesive strength so as to still maintain the adhesive strength, even if allowed to stand at room temperature, for example, at about 15° C. to about 45° C. for about 24 hours and thus easily supports the active ingredients, and in addition, may be used after using conventional leave-on products (toner, essence, cream, etc.) as well as used alone. In addition, the gel composition does not contain a large amount of water like (or does not contain water at all), the hydrogel formulation and thus is not cold when applied to the skin, and is not stuffy but is comfortable like an oil gel formulation, and also, is inexpensively manufactured, and accordingly, may support both hydrophilic active ingredients and hydrophobic active ingredients and contains a large amount of the polyol (e.g., the polyol may be included in an amount of about 60 wt % to about 98 wt %, for example, about 60 wt % to about 95 wt %, or for example about 60 wt % to about 90 wt % based on the total amount of the sheet-type mask gel composition) and thus may be easily manufactured into products without special preservatives.

The sheet-type mask gel composition according to an embodiment includes an excess of the polyol and thickener to ensure a moisturizing and soft feeling, and is effective in delivering active ingredients. In addition, since the thickener may include a carboxyl group, the carboxyl group in the thickener reacts with a hydroxy group of the polyol and thus greatly reduces moisture during preparation of the gel composition and forms an insoluble gel, and such a gel has very high adhesiveness and thus is easily attached to the skin and has an excellent effect of delivering active ingredients to the skin.

Particularly, the sheet-type mask gel composition according to an embodiment includes the emulsion composition and necessarily includes the butters, oils, waxes, or a combination thereof, which come out from the mask sheet according to an embodiment at a skin temperature and deliver the active ingredients to the skin, wherein the transuded butters, oils, waxes, the like move between the mask sheet and the skin and thus are expected to deteriorate adhesive strength of the mask sheet, but the mask sheet according to an embodiment keeps very excellent adhesive strength.

On the other hand, since the mask sheet is manufactured by using the butters, oils, waxes, and the like, even though the active components are well delivered through the butters, oils, and/or waxes from the mask sheet to the skin, the butters, the oils, and/or the waxes may come out during the distribution and thus deteriorate quality of the mask sheet (cause problems of contaminating a release film by the transuded oils and the like and not supporting the active components as well as desired by consumers until used), and accordingly, the sheet-type mask gel composition in which the butters, oils, and/or waxes are supported should have excellent support stability of the butters/oils/waxes during the distribution but have not sufficiently secured the support stability yet, and most of the currently commercially available adhesive mask sheets including the oils and the like contain a very small amount of the oils (e.g., less than about 1 wt % based on the total amount of the sheet-type mask gel composition). In addition, an adhesive sheet mask containing a large amount of the oils may be manufactured by using a conventional emulsification technique, but herein, the gel emulsified particles have a large average particle diameter of a micrometer unit and thus are trapped in a gel structure, resultantly having no influence on the skin at all, which has no meaning for skin beauty.

In addition, since the oils, butters, and waxes are solids at room temperature, a temperature thereof should be increased to overly mix them into the sheet-type mask gel composition according to one aspect of the present disclosure, but when the temperature is increased, the composition may be crosslinked and hardened and thus not manufactured into a sheet, but since the oils, butters, and waxes are not sufficiently emulsified at a low temperature but come from the sheet during the distribution and thus deteriorate safety of the sheet, it is difficult to provide a sheet-type mask gel composition containing an excess of the oils, butters, and waxes (e.g., about 5 wt % or more, for example, about 10 wt % or more based on the total amount of the sheet-type mask gel composition).

In addition, since mixed components of the oils, butters, and/or waxes are released from the mask sheet at a skin temperature and move around between the mask sheet and the skin and resultantly, deteriorate adhesion strength of the mask sheet, it is not easy to develop the sheet-type mask gel composition.

However, according to an embodiment, even though the oils and the like start to be delivered, since adhesion strength to the skin is not deteriorated, there is no discomfort such as the mask sheet falling off the skin during the use. In other words, the sheet-type mask gel composition according to an embodiment includes butters, oils, and/or waxes effectively delivering active ingredients in the form of an emulsion composition, not themselves, and accordingly, an excess of the butters, oils, and/or waxes may be supported therein (excellent support stability), the butters, oils, and/or waxes are not much released even during the distribution but well released only at a skin temperature after attached to the skin, and a mask sheet holds excellent adhesive strength during the use despite the released butters, oils, and/or waxes and maintains high skin moisturizing power after taken off from the skin. The reason is that the emulsion composition is prepared by emulsifying the butters, oils, and/or waxes with a surfactant but not a thickener, and then, a gel composition is prepared by adding the thickener and the like thereto for gelation. In other words, the emulsion composition may include 'at least one selected from butters, oils, waxes, and a combination thereof,' 'a surfactant,' and 'a polyol' (or the emulsion composition may be composed of 'at least one selected from butters, oils, waxes, and a combination thereof,' 'a surfactant,' and 'a polyol').

For example, the surfactant may include two or more fatty acids.

When a surfactant having two or more fatty acids is not used, for example, when a surfactant having one fatty acid is used, the viscosity of the gel composition is lowered. In this case, the formulation may become unstable, making it difficult to manufacture the mask sheet. In addition, stability of the gel composition may be lowered, so that butters, oils and/or waxes may be easily out at high temperatures, and phase separation may occur. For this reason, the effective ingredient delivery from the mask sheet to the skin is not good, and even after the mask sheet is removed, the duration of the moisturizing power of the skin may be short.

For example, the surfactant including the two or more fatty acids may include lecithin.

The emulsion composition may further include an aliphatic alcohol, for example an aliphatic alcohol having 16 to 22 carbon atoms, for example an aliphatic alcohol having 16 or 18 to 22 carbon atoms (e.g., an aliphatic alcohol having 16 carbon atoms, an aliphatic alcohol having 18 carbon atoms, 22 carbon atoms aliphatic alcohols having carbon number, etc.).

For example, the emulsion composition may further include cetearyl alcohol and/or behenyl alcohol to lecithin, which is the surfactant including the two or more fatty acids.

For example, the surfactant including two or more fatty acids may include polyglyceryl-3 methylglucose distearate/cetearyl glucoside/methyl glucoside sesquistearate/butylene glycol, polyglyceryl-3 methylglucose distearate, sorbitan sesquioleate, hydrogenated lecithin, hydrogenated lecithin/C12-16 alcohols/palmitic acid, lecithin, cetearyl alcohol*glyceryl stearate*stearic acid*hydrogenated lecithin*polyglyceryl-3 methylglucose distearate, soybean phospholipid, and the like, but is not necessarily limited thereto.

The surfactant including two or more fatty acids may be used alone, or two or more surfactants may be used together. When the lecithin that is the surfactant including two or more fatty acids, and other alcohols (cetearyl alcohol, behenyl alcohol, or a combination thereof, etc.) are used together, the lecithin may be included in a lower content than the other alcohols. For example, when that lecithin that is the surfactant including two or more fatty acids, includes both cetearyl alcohol and behenyl alcohol, the cetearyl alcohol may be included in a greater amount than the behenyl alcohol. In this case, even if the emulsion composition reacts with the polyol, the thickener, etc., which will be described later, its shape does not collapse and may be well maintained in the final composition.

Examples of the butters and waxes include shea butter, Floraester 60, and rice butter, but are not necessarily limited thereto.

The oil may be desirably an oil having low compatibility with the polyol, for example, glycerin. In the case of the oil having good compatibility with the polyol, it is not well made, and even if it is made, the oils are not out well from the mask sheet because it has good compatibility with the polyol, so the delivery of the active ingredient to the skin may not be good. For example, the oils having low compatibility with the polyol may include at least one selected from the ester oils, hydrocarbon oils, and silicone oils, but are not necessarily limited thereto.

For example, the oils may include almond oils, avocado oils, bee waxes, Brazil nut oils, castor oils, jojoba oils, mineral oils, olive oils, tocopherol, MCT oils containing 6 to 12 carbon atoms (medium chain triglyceride oil), hydrogenated polyisobute, hydrogenated polydecene, hydrogenated poly(C6-14) olefin, squalene, isopropyl myricitate, isopropyl palmitate, cetyloctanoethite, decyl and cocoate dimethicone, or a combination thereof, but is not necessarily limited thereto. For example, specific examples of the MCT oils may include caproic acid having 6 carbon atoms, caprylic acid having 8 carbon atoms, capric acid having 10 carbon atoms, lauric acid having 12 carbon atoms, or a combination thereof, but is not necessarily limited thereto.

For example, the emulsion composition may include cetearyl alcohol and behenyl alcohol together with lecithin that is a surfactant, wherein the surfactant, cetearyl alcohol, and behenyl alcohol may be included in an amount of about 0.1 wt % to about 20 wt % based on the total amount of the emulsion composition.

For example, the polyol may be included in an amount of about 50 wt % to about 80 wt %, and at least one selected from butters, oils, waxes, and a combination thereof may be included in an amount of about 1 wt % to about 40 wt %, and the surfactant may be included in about 0.1 wt % to about 20 wt % based on the total amount of the emulsion composition.

For example, the at least one selected from butters, oils, waxes, and a combination thereof may be included in an amount greater than that of the surfactant.

For example, the emulsion composition may have a lamellar (maltese cross) structure. Before the emulsion composition is gelled by the thickener, a lamellar structure is observed when viewed under polarized light (when viewed with polarized light, a brightly shining structure is observed, which is a lamellar structure, see FIG. 2). Furthermore, the lamellar structure may be maintained even when the emulsion composition is mixed with the polyol and the thickener to form a gel or heated after gelation (see FIGS. 3 and 4).

In general, the lamellar structure has a structure similar to that of the stratum corneum of the skin, so it strengthens the skin barrier to increase skin moisturizing power. In addition, it has a high affinity for the skin and a high penetration rate into the stratum corneum, so that the active ingredient for skin whitening or wrinkle improvement can reach the dermis, and the skin penetration time of the active ingredient can be controlled and thus its efficacy can be maintained.

The emulsion composition may be diluted in water, and the emulsion composition diluted in water may be composed of particles having an average particle diameter of about 300 nm to about 400 nm. When the emulsion composition itself, which is not diluted in water, is observed with a microscope, a lamellar structure of several micrometer units is observed, but when diluted by an excess of water, as the emulsion composition is dispersed into particles with a bimolecular film structure, a particle diameter thereof becomes smaller. Accordingly, when an average particle diameter is measured after diluting the emulsion composition in water, and the average particle diameter is in a range of about 300 nm to about 400 nm, the emulsion composition may be easily inferred to have a lamellar structure. In addition, when the emulsion composition has a lamellar structure with the average particle diameter, even though heated after adding a polyol and a thickener thereto, since the emulsion composition may not be structurally destroyed but exhibits excellent stability, the oils, butters, and/or waxes may not well come out therefrom.

As for an emulsion composition prepared by using particles having an average particle diameter out of the range of about 300 nm to about 400 nm, compared with the emulsion composition prepared by using particles with the average particle diameter of about 300 nm to about 400 nm, since the butters, oils, and/or waxes more come out at a high temperature due to deterioration of high temperature stability of a gel composition, when a mask sheet is actually used, the butters, oils, and/or waxes in a small amount are supported therein and thus do not well deliver the active ingredients, and when the mask sheet is taken off, moisture is quickly removed from the skin, which makes a user easily feel dry.

For example, the sheet-type mask gel composition according to an embodiment may include about 49 wt % to about 90 wt % of the polyol, about 5 wt % to about 50 wt % of the emulsion composition, and about 1 wt % to about 10 wt % of the thickener based on the total amount of the sheet-type mask gel composition.

For example, the emulsion composition may be included in an amount greater than that of the thickener.

The polyol may impart a feeling of moisture and flexibility to the skin due to a plurality of hydroxyl groups, and if it is a common polyhydric alcohol compound, it may be used without particular limitation. For example, the polyol may include glycerine, 1,3-butanediol, propylene glycol, polyethylene glycol, dipropylene glycol, propanediol, or a combination thereof, but is not necessarily limited thereto.

The polyol may be included in excess, for example, in an amount of about 49 wt % to about 98 wt %, for example about 49 wt % to about 95 wt %, for example about 49 wt % to about 90 wt % based on the total amount of the sheet-type mask gel composition. When the polyol is included in the above range, it is possible to secure a feeling of moisture and flexibility while at the same time to secure a refreshing feeling of use. For example, when the polyol is included in an amount of less than about 49 wt % based on the total amount of the sheet-type mask gel composition, moisturizing and softness may be deteriorated, and when included in an amount of greater than about 98 wt %, moisturizing and flexibility may be improved, but sticky or stuffy feeling of use may occur.

The thickener is not particularly limited as long as it is a generally well-known thickener. For example, the thickener may contain one or more carboxyl groups. The thickener may serve to increase the viscosity of the sheet-type mask gel composition.

The thickener may include xanthan gum, hyaluronic acid, carboxylmethyl cellulose, polyacrylate carboxylmethyl starch, carboxylmethyl chitosan, carboxylmethyl dextran, or a combination thereof, but is not necessarily limited thereto.

The thickener may be included in an amount of about 0.01 wt % to about 20 wt %, for example about 1 wt % to about 15 wt %, for example about 1 wt % to about 10 wt % based on the total amount of the sheet-type mask gel composition. When the content of the thickener is within the above range, the viscosity enhancing effect of the gel composition may be improved and the feeling of use may be excellent. For example, when the thickener is included in an amount of less than about 0.01 wt % based on the total amount of the sheet-type mask gel composition, the effect of increasing the viscosity on the gel composition may be insignificant. If it exceeds about 20 wt %, the viscosity of the gel composition is excessively high, which is not desirable because the feeling of use may be reduced or filling may not be easy.

The sheet-type mask gel composition and the mask sheet including the same according to an embodiment may contain very little moisture or may not contain moisture at all. The reason is that water in the gel composition is included in a small amount of less than about 10 wt %, for example, less than about 5 wt % based the total amount of the gel or not included at all, and the moisture is further removed by a reaction of the polyol and the thickener which are the other components. In this way, since the gel composition is prepared by using a small amount of water or not using water at all, the gel composition and a mask sheet including the same may efficiently deliver active ingredients through the butters, oils, and/or waxes. In addition, since there is little (or no) moisture in the gel composition, the gel composition is strong against microbial contamination, has higher adhesiveness than a hydrogel and the like and thus may be easily attached to the skin, and has excellent effects of delivering active ingredients to the skin.

For example, the sheet-type mask gel composition according to an embodiment may satisfy Equation 1.

$$100-(B/A\times100)<10 \qquad \text{[Equation 1]}$$

wherein, A is a weight immediately after arbitrary processing of the gel obtained by gelling the gel composition to 5 cm×5 cm×1 mm, and B is a weight immediately after drying the gel immediately after the above arbitrary processing at 45° C. for 60 minutes.

In order to maintain the adhesive strength of the gel composition and a mask sheet including the same for a long time, it is important to maintain its initial composition while attached, and the conventional hydrogel or general mask sheets are not suitable for long-term use because moisture is volatilized from a finished hydrogel or a mask sheet itself and thereby adhesive strength is deteriorated so it is not particularly suitable for a subsequent use after using the existing leave-on products.

However, in the sheet-type mask gel composition according to an embodiment, even if butters, oils, and/or waxes are out and move to the skin, the butters, oils and/or waxes are included in the form of an emulsion composition constituting the gel composition, so that the adhesive strength may be well maintained, while attached, which may be confirmed by unpacking the gel composition or mask sheet, removing a release film therefrom, and comparing an initial weight right after exposure to the outside and a weight after a certain period of time to obtain a dried amount and thus check whether or not the initial adhesive strength is maintained.

Specifically, when Equation 1 is satisfied, the initial adhesive strength is well maintained, and even if it is adhered for a long time, for example, greater than or equal to about 30 minutes, for example greater than or equal to about 1 hour, for example greater than or equal to about 2 hours, for example greater than or equal to about 3 hours, desirably greater than or equal to about 4 hours, for example greater than or equal to about 5 hours, for example greater than or equal to about 6 hours, for example greater than or equal to about 7 hours, for example greater than or equal to about 8 hours, for example greater than or equal to about 9 hours, for example greater than or equal to about 10 hours, for example greater than or equal to about 11 hours, for example greater than or equal to about 12 hours, for example greater than or equal to about 24 hours, the gel composition or the mask sheet maintains almost the same level of adhesive strength as before attachment.

In addition, the gel composition or the mask sheet satisfying Equation 1 may have at least about 80% of the initial adhesive strength (100%) or higher when the sheet-type mask gel composition or the mask sheet is applied or attached after applying water-soluble or oil-soluble compositions (the existing leave-on products and the like) to skin of a mammal than when the sheet-type mask gel composition or the mask sheet alone is directly applied or attached to the skin of a mammal. As aforementioned, when the gel composition or the mask sheet is used after using the existing leave-on products and the like, the gel composition or the mask sheet may exhibit more excellent adhesive strength, because the gel composition or the mask sheet does exhibits almost no composition change over time. In other words, other conventional mask sheets exhibit deteriorated adhesive strength, when different compositions are applied in attached areas by using the leave-on products and the like, but the gel composition or the mask sheet according to an embodiment exhibits more excellent adhesive strength when subsequently used after using the conventional leave-on products and the like than when used alone. The conventional hydrogel or general mask sheets exhibit adhesive strength differences with rapid weight losses, when unpacked for use (attached to the skin) and exposed to the outside, and in addition, since moisture in the leave-on products and the like is added thereto and thus inhibits the adhesive strength, when the conventional hydrogel or general masks are subsequently attached after using the existing leave-on products and the like the adhesive strength itself is more greatly deteriorated than when used alone, and accordingly, the conventional hydrogel or general mask sheets may not be suitable for the layering skin care in which mask sheets and the like are attached after applying cosmetic compositions (cosmetics). For example, the sheet-type mask gel composition according to an embodiment or mask sheet including the same may have adhesive strength of greater than or equal to about 30 g/cm$^2$, for example about 30 g/cm$^2$ to about 150 g/cm$^2$, for example about 60 g/cm$^2$ to about 150 g/cm$^2$. The adhesive strength is based on the use of the sheet-type mask gel composition or the mask sheet including the same alone, and when the sheet-type mask gel composition or the mask sheet including the same is used after using the leave-on products such as creams and the like, the adhesive strength may be further increased. For example, when the layering skin care is applied, the adhesive strength may be about 40 g/cm$^2$ to about 60 g/cm$^2$ higher than the adhesive strength when used alone.

The adhesive strength of greater than or equal to about 30 g/cm$^2$ is higher than the adhesive strength (about 20 g/cm$^2$) of the conventional hydrogel composition, and accordingly, the sheet-type mask gel composition or the mask sheet including the same may be easily attached to the skin and have excellent delivery effects of active ingredients to the skin.

The adhesive strength of the sheet-type mask gel composition or the mask sheet including the same may be measured by using a texture analyzer.

Specifically, a sheet specimen is cut into a size of about 3 cm×about 3 cm, and the cut sheet is fixed into a specimen stand by using a double-sided adhesive tape. A probe with a diameter of about 1 cm is lowered until about 10 g of a force is applied to the specimen, allowed to have 10 seconds of contact time, and raised at about 2 mm/sec. Herein, a measured maximum force is recorded to measure adhesive strength of a sheet-type mask gel composition or a mask sheet including the same itself.

Subsequently, after evenly applying about 0.03 g of a cream (Innisfree Jeju Orchid Cream) on the surface of the specimen, a maximum force is measured under the same condition to obtain adhesive strength of the sheet-type mask gel composition or the mask sheet including the same when a layering cosmetic method is applied.

Meanwhile, the sheet-type mask gel composition according to an embodiment may further include a wrinkle-improving material such as oleanolic acid, a whitening material, a skin trouble-improving material, or a combination thereof, if necessary.

The oleanolic acid is a functional material effective in improving wrinkles, and when the gel composition according to an embodiment further includes the oleanolic acid, it can exhibit a wrinkle improvement effect within a short time when using other wrinkle-improving functional cosmetics containing oleanolic acid. It can exhibit a wrinkle improvement effect.

For example, when the sheet-type mask gel composition according to an embodiment includes a functional material effective for improving wrinkles, such as oleanolic acid, the anti-wrinkle function may be improved.

Examples that can be used as the wrinkle-improving material may include retinol, retinyl palmitate, polyethoxylated retinamide, adenosine, enzyme-treated red ginseng saponin, etc., in addition to the oleanolic acid. The desirable content range may be about 0.001 wt % to about 5.0 wt % based on the total amount of the composition. However, the type and content of the wrinkle-improving material is not limited to the above example.

Examples of the whitening material include mulberry extract, arbutin, oil-soluble licorice extract, niacinamide, alpha-bisabolol, ethyl ascorbyl ether, ascorbyl glucoside, ascorbyl tetraisopalmitate, melasolve, tranexamic acid, and the like. In addition, the desirable content range of the whitening material may be about 0.001 wt % to about 5.0 wt % based on the total amount of the composition. However, the type and content of the whitening material is not limited to the above example.

For example, niacinamide may be used as the whitening material, and the niacinamide may be included in an amount of about 0.01 wt % to about 4.0 wt %, for example about 0.05 wt % to about 3.0 wt %, based on the total amount of the composition, but is not necessarily limited thereto.

The substances for improving the troubles may include madecassoside, *Centella asiatica*, beta-sitosterol, allantoin, panthenol, tranexamic acid, urea, AHAs, BHAs, potassium licorate, tea tree oil, sulfur, volcanic cluster powder, etc. The desirable content range of the material for improving the troubles may be about 0.001 wt % to about 20 wt % based on the total amount of the composition. However, the type and content of the material for improving the trouble is not limited to the above examples.

In addition, the sheet-type mask gel composition may further include an absorption enhancer or the like depending on the purpose.

For example, the sheet-type mask gel composition may further include an inorganic material. For example, the inorganic material may include titania, sulfur, zinc oxide, calamine, clay, and the like. For example, when the inorganic material includes titania, a light blocking effect, more specifically a blue light blocking effect, may be achieved. At this time, the titania may be water-dispersed titania, but is not necessarily limited thereto.

The inorganic material such as titania may be included in an amount of greater than or equal to about 0.01 wt %, for example about 0.01 wt % to about 1 wt %, for example about 0.1 wt % to about 1 wt %, for example about 0.5 wt % to about 1 wt %, for example greater than or equal to about 0.6 wt %, for example about 0.6 wt % to about 1 wt %, for example greater than or equal to about 0.7 wt %, for example about 0.7 wt % to about 1 wt % based on the total amount of the gel composition. When the inorganic material such as titania is included in the content range, the mask sheet including the gel composition according to an embodiment may effectively block blue light, and thus function as a blue light blocking patch. In particular, when the mask sheet is used as a partial mask sheet, for example, an eye mask, it is possible to effectively block blue light emitted from the display of an electronic device, and to improve darkening under the eyes through a whitening function. In addition, when the inorganic material such as titania is included in an amount of greater than about 2 wt % based on the total amount of the gel composition, the properties of the gel may be damaged.

Specifically, the mask sheet having the blue light blocking performance may be manufactured by supporting the gel composition on a yellow sheet. Since yellow is a complementary color to blue, it selectively absorbs blue light, which can be effective in lowering the absorption of light coming into the eyes.

In addition, the mask sheet having the blue light blocking performance may be prepared by laminating the gel composition on a polyurethane support.

In addition, the sheet-type mask gel composition according to an embodiment may further include a skin conditioning agent. The skin conditioning agent is a component that supplies nutrients to the skin, and may include panthenol, vitamins, niacinamide, adenosine, retinol, melasolve, and aloe, green tea, ginseng, pine needles, mulberry leaves, lavender, etc. as extracts. However, there is no particular limitation on the amount used. In addition, the sheet-type mask gel composition according to the embodiment may further include any one or more additives such as preservatives and fragrances (additives that can be additionally included in a conventional cosmetic composition) as needed, and detailed description thereof will be omitted.

Another embodiment provides a mask sheet including the sheet-type mask gel composition.

The mask sheet may be manufactured by a method for manufacturing a mask sheet to be described later.

The shape or thickness of the mask sheet is not particularly limited, and the mask sheet commonly used in the art may be applied. In addition, on the skin-contacting surface of the mask sheet and the like, additional substances such as capsules where cream, and the like are supported may be disposed, and accordingly, within a range of expressing the effects of the sheet-type mask gel composition, any component, substrate, or the like which may enhance skin health may be included in the sheet-type mask gel composition.

The mask sheet may have a support attached to any one surface of the mask sheet. The support may be for reducing damage such as folding or tearing of the mask sheet but protecting the skin contact surface of the mask sheet. The support may be a non-woven fabric made of fibers of recycled fibers such as cotton, rayon, etc., elastic polyurethane, acetate, wool, an ester-based material including polyethylene glycol terephthalate, etc., and polyethylene (PE), nylon, polypropylene (PP), or a combination thereof, a woven fabric, oriented polypropylene (OPP), casting polypropylene (CPP), high-density polyethylene (HDPE), low-density polyethylene (LDPE), linear low-density polyethylene (LLDPE), or a support in which the aforementioned material is laminated on a non-woven fabric in the form of a film, but is not necessarily limited thereto. In addition, the support may be transparent in order to impart an aesthetic feeling and ensure transparency of the product.

The mask sheet may have a release film attached to the other surface of the mask sheet to which the support may be attached. Any release film may be used as long as it is a release film or a laminate thereof that is commonly used in transdermal formulations such as a mask pack. For example, the release film may be a film such as polypropylene, polyethylene, polyester, polyvinyl chloride, polyvinylidene chloride, or paper on which the above-mentioned materials are laminated, but is not necessarily limited thereto.

Another embodiment provides a method of manufacturing the aforementioned mask sheet.

The method of manufacturing the mask sheet includes (a) emulsifying at least one selected from butters, oils, waxes, and a combination thereof, a surfactant, and a polyol to prepare an emulsion composition; (b) stirring the emulsion composition with a polyol and a thickener, and uniformly coating the stirred material on a release film; (c) uniformly coating the stirred material on a release film and then heating and cooling to gel; and (d) attaching a support to the surface on which the stirred material is gelled to manufacture g a mask sheet.

According to the mask sheet manufacturing method, since the emulsion composition is prepared by emulsifying at least one selected from the butters, oils, waxes, and a combination thereof with the surfactant and the polyol, and then, the emulsion composition is stirred with the polyol and the thickener and gelled, even though the butters, oils, and/or waxes in a large amount are supported therein, the butters, oils, and/or waxes do not easily come out from the mask but effectively deliver the active ingredients to the skin, and since the butters, oils, and/or waxes are included as the emulsion composition, even though the butters, oils, and/or waxes come out therefrom during the use of the mask sheet, deterioration of adhesive strength of the mask sheet due to the transuded butters, oils, and/or waxes is minimized, which brings no great inconvenience in using the mask sheet.

The mask sheet manufactured by the above manufacturing method may maintain adhesive strength even after a long time, for example, greater than or equal to about 30 minutes, for example greater than or equal to about 1 hour, for example greater than or equal to about 2 hours, for example greater than or equal to about 3 hours, for example greater than or equal to about 4 hours, for example greater than or equal to about 5 hours, for example greater than or equal to about 6 hours, for example greater than or equal to about 7 hours, for example greater than or equal to about 8 hours, for example greater than or equal to about 9 hours, for example greater than or equal to about 10 hours, for example greater than or equal to about 11 hours, for example greater than or equal to about 12 hours, for example greater than or equal to about 12 hours to 24 hours, after being attached to the skin, and may have a high moisturizing power in the skin for greater than or equal to about 6 hours even after being detached, making it difficult to feel dryness. The mask sheet manufactured by the above manufacturing method can maintain its adhesiveness even after a long time, for example, 30 minutes or more, after being attached to the skin, and has a high moisturizing power in the skin for 6 hours or more even after being detached, making it difficult to feel dryness.

The mask sheet manufactured by the above manufacturing method may maintain its adhesive strength even after a long time, for example, greater than or equal to about 30 minutes, after being attached to the skin, and has a high moisturizing power in the skin for 6 hours or more even after being detached, making it difficult to feel dryness.

The method for manufacturing the mask sheet may further include aging the gel attached so as to the support to control physical properties.

In the process (c), the heating may be performed at a temperature of about 70° C. to about 120° C. for about 2 minutes to about 30 minutes.

In addition, in the process (b), the stirring of the emulsion composition with the polyol and the thickener may be stirring, if necessary, an additive such as a wrinkle-improving material, a whitening material, a skin trouble-improving material, or a combination thereof with the emulsion composition, the polyol, and the thickener.

The embodiments of one aspect of the present disclosure described above will be described in more detail through the following examples.

However, these examples are exemplary, and the present disclosure is not limited thereto.

PREPARATION EXAMPLES

Each composition according to Preparation Examples 1 to 6, Comparative Preparation Examples 1 to 3, and Reference Example 1 was prepared to respectively have the compositions shown in Table 2. Specifically, after preparing each fine emulsion composition to respectively have the compositions shown in Table 1, each fine emulsion composition along with a thickener (xanthan gum; Keltrol-F) was added to glycerine and then, stirred to gelation at 7000 rpm for 3 minutes by using a homomixer (T. K. Homomixer Mark II, PRIMIX). In (Preparation Examples 1 to 3, Comparative Preparation Example 1, and Reference Example 1) Preparation Examples 4 to 6, the thickener was added with titania and niacinamide.

In Comparative Preparation Example 2, the fine emulsion composition was not first prepared, but the components used in Preparation Example A with the glycerine and the thickener were mixed to gelation at once and then, stirred at 7000 rpm for 3 minutes by using a homomixer (T. K. Homomixer Mark II, PRIMIX).

In Comparative Preparation Example 3, purified water, the glycerine, the thickener, and Hygel 20D were mixed at once and then, stirred to gelation at 7000 rpm for 3 minutes by using a homomixer (T. K. Homomixer Mark II, PRIMIX).

TABLE 1

(unit: wt %)

| | Preparation Example A | Preparation Example B | Preparation Example C | Preparation Example D | Preparation Example E |
|---|---|---|---|---|---|
| Miristol-331 (BASF) (oils) | 10 | 1.5 | 5 | — | — |
| Lipoid p100-3 (Lipoid Kosmetik) (surfactant including two or more fatty acids) | 1.5 | 5 | 1.5 | — | — |
| (ARLACEL 165VEG (Glyceryl Stearate and PEG-100 Stearate, Uniquema) (surfactant including one fatty acid) | — | — | — | — | 11.5 |
| FLORAESTERS 60 (FLORATECH) (butters and/or waxes) | 15 | 20 | 20 | 26.5 | 15 |
| Glycerin (polyol, IOI Acidchem) | 73.5 | 73.5 | 73.5 | 73.5 | 73.5 |

TABLE 2

(unit: wt %)

| | | Preparation Example | | | | | | Comparative Preparation Example | | | Reference Example |
|---|---|---|---|---|---|---|---|---|---|---|---|
| | | 1 | 2 | 3 | 4 | 5 | 6 | 1 | 2 | 3 | 1 |
| Purified water | | — | — | — | — | — | — | — | — | 87.4 | — |
| Glycerine | | 77.3 | 77.3 | 77.3 | 74.6 | 74.3 | 74.8 | 77.3 | 77.3 | 10 | 77.3 |
| Thickener | | 2.7 | 2.7 | 2.7 | 2.7 | 2.7 | 2.7 | 2.7 | 2.7 | 1 | 2.7 |
| Higel 20D | | — | — | — | — | — | — | — | — | 1.6 | — |
| Titania | | — | — | 0.7 | 1.0 | 0.5 | — | — | — | — | — |
| Niacin amide | | — | — | — | 2.0 | 2.0 | 2.0 | — | — | — | — |
| Fine emulsion composition | Preparation Example A | 20 | — | — | 20 | 20 | 20 | — | 20 (each component constituting the composition of Preparation A in the non-emulsified state) | — | — |
| | Preparation Example B | — | 20 | — | — | — | — | — | — | — | — |
| | Preparation Example C | — | — | 20 | — | — | — | — | — | — | — |
| | Preparation Example D | — | — | — | — | — | — | 20 | — | — | — |
| | Preparation Example E | — | — | — | — | — | — | — | — | — | 20 |

In Table 2, Hygel 20D is a commercially available raw material manufactured by mixing gelling polymers such as carrageenan, locust bean gum, and the like and specifically, includes 50 wt % of the carrageenan, 20 wt % of the locust bean gum, 10 wt % of agar, 10 wt % of guar gum, 5 wt % of glucose, and 5 wt % of potassium chloride.

EXAMPLES

Example 1

The composition (liquid) with viscosity according to Preparation Example 1 was uniformly coated on a release film and then, heated and cooled down, and a support was applied on the other side where the release film was not attached, manufacturing a mask sheet.

Example 2

A mask sheet was manufactured according to the same method as Example 1 except that the composition (liquid) having viscosity according to Reference Example 1 instead of Preparation Example 1 was used.

Example 3

A mask sheet was manufactured according to the same method as Example 1 except that the composition (liquid) with viscosity according to Reference Example 4 was uniformly coated on a release film and then, heated and cooled down, and a support was applied on the other side to which the release film was not attached.

Example 4

A mask sheet was manufactured according to the same method as Example 1 except that the composition (liquid) with viscosity according to Reference Example 5 was uniformly applied on a release film and then, heated and cooled down, and on the other surface to the release film was not attached, a support was applied.

Example 5

A mask sheet was manufactured according to the same method as Example 1 except that the composition (liquid) with viscosity according to Reference Example 6 was uniformly applied on a release film and then, heated and cooled down, and on the other surface to the release film was not attached, a support was applied.

Comparative Example 1

A mask sheet was manufactured according to the same method as Example 1 except that the composition (liquid) with viscosity according to Comparative Preparation Example 1 instead of Preparation Example 1 was used, but a mask sheet itself was not manufactured due to the absence of the surfactant.

Comparative Example 2

A mask sheet was manufactured according to the same method as Example 1 except that the composition (liquid) with viscosity according to Comparative Preparation Example 2 instead of Preparation Example 1 was used.

Comparative Example 3

A mask sheet was manufactured according to the same method as Example 1 except that the composition (liquid) with viscosity according to Comparative Preparation Example 3 instead of Preparation Example 1 was used.

Evaluation 1: Particle Sizes of Particles Constituting Fine Emulsion Composition Zetasizer (Zetasizer Nano ZS, Malvern Panaytical Ltd., United Kingdom) was used to measure average particle diameters of the fine emulsion compositions according to Preparation Examples A to C, and the results are shown in FIG. 1.

Referring to FIG. 1, the emulsion composition constituting a gel composition according to an embodiment was composed of particles having an average particle diameter of 300 nm to 400 nm.

Evaluation 2: Lamellar Structure

Figure 2:
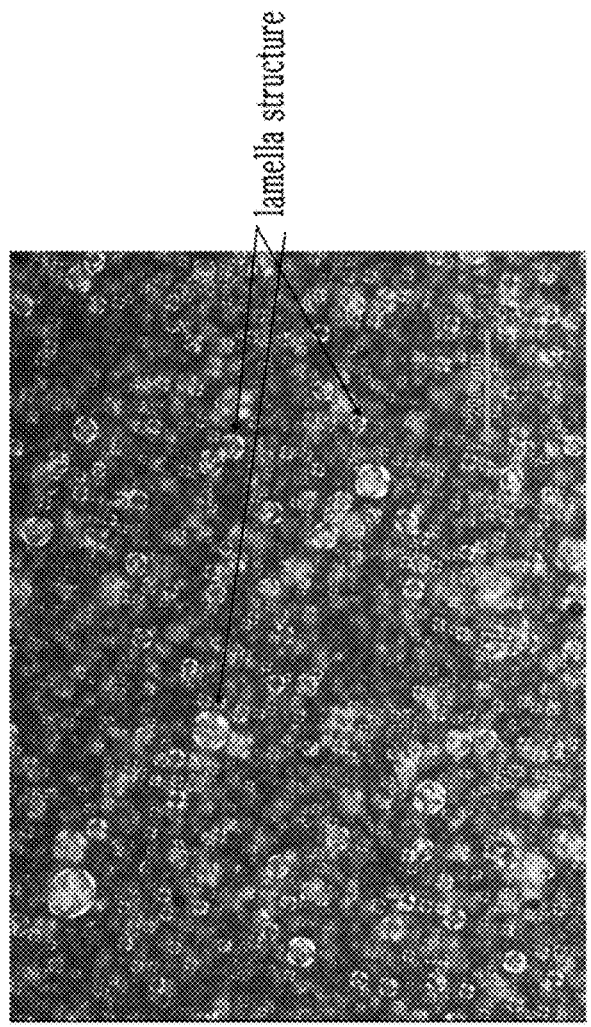
FIG. 2 is a polarized photograph of the emulsion composition of Preparation Example 1, which shows a lamellar structure.
Figure 3:
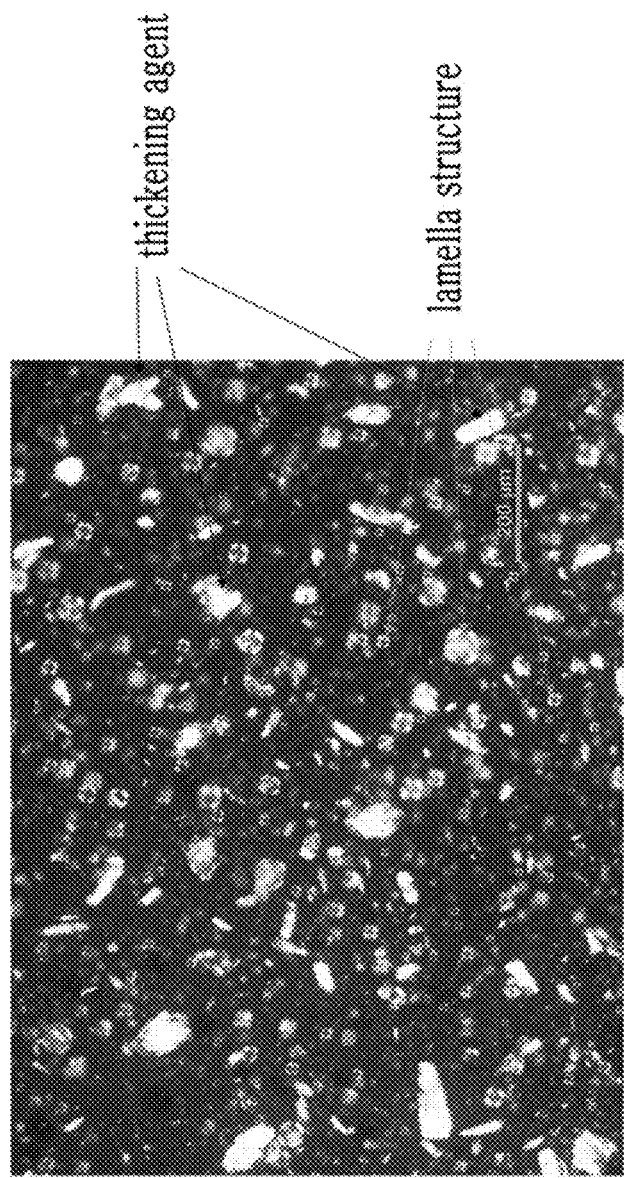
FIG. 3 is a polarized photograph of the gel composition of Preparation Example 1, which shows a lamellar structure.
Figure 4:
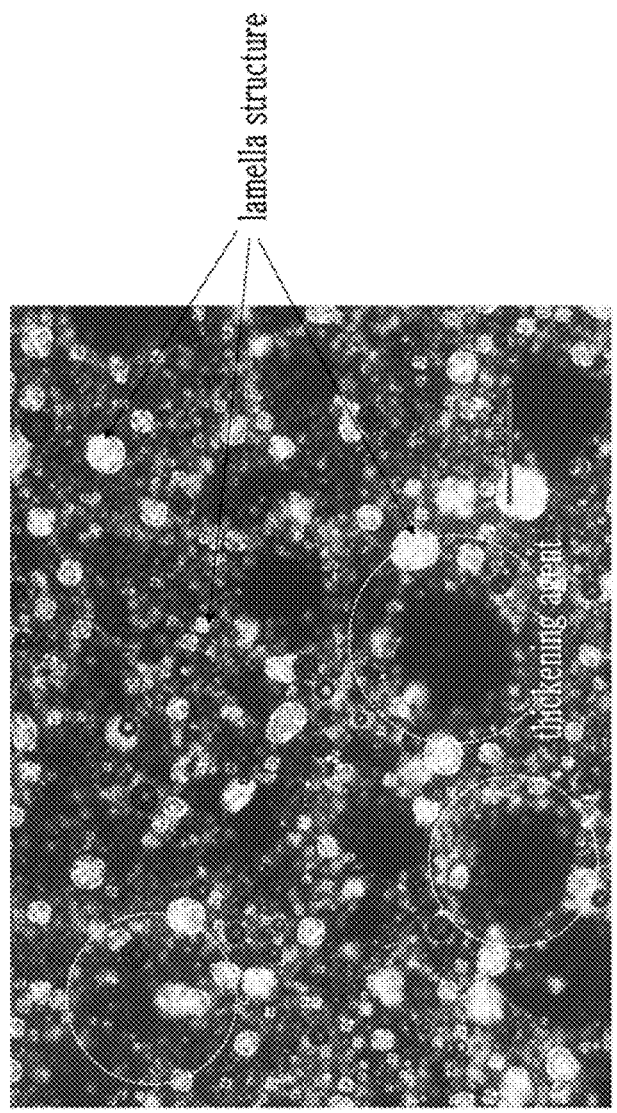
FIG. 4 is a polarized photograph after heating the gel composition of Preparation Example 1, which shows a lamellar structure.

Whether or not a lamellar structure was observed in the emulsion compositions according to Preparation Examples A to E was examined by using a polarization microscope (DSX100, Olympus Corp., Japan), and the results are shown in Table 3 and FIGS. 2 to 4.

TABLE 3

| | Preparation Example A | Preparation Example B | Preparation Example C | Preparation Example D | Preparation Example E |
|---|---|---|---|---|---|
| Lamellar structure | ○ | ○ | ○ | x | x |

○: lamellar structure observed
x: no lamellar structure was observed

Referring to Table 3 and FIGS. 2 to 4, the emulsion composition constituting the gel composition turned out to have a lamellar structure. Referring to FIGS. 2 to 4, a round-shaped lamellar structure with various sizes was observed in all regions, referring to FIG. 3, a sheet-shaped thickener was observed, and referring to FIG. 4, a thickener after crosslinking was observed.

Evaluation 3: Adhesive Strength

The gel composition specimens according to Preparation Example 1, Reference Example 1, and Comparative Preparation Example 2 were cut into size of 3×3 cm, and each cut sheet was fixed to a specimen stand by using a double-sided adhesive tape. Subsequently, a probe with a diameter of 1 cm was lowered, until a force of 10 g was applied to the specimens, allowed to have contact time of 10 seconds, and then, raised at 2 mm/sec. Herein, a measured maximum force was recorded to measure adhesive strength of a composition itself, and at the same time, after evenly applying 0.03 g of a cream (Innisfree Jeju Orchid cream) on the specimen, adhesive strength of the composition, when a layering cosmetic method was applied, also was measured in the same method. This experiment was respectively three times performed to calculate an average, and the results are shown in Table 4.

TABLE 4

| | (unit: g/cm²) | | | | | |
|---|---|---|---|---|---|---|
| | Preparation Example 1 | | Reference Example 1 | | Comparative Preparation Example 2 | |
| | S1 | S2 | S1 | S2 | S1 | S2 |
| Average | 62 | 145 | 31 | 76 | 19 | 14 |

S1: Use of gel composition alone
S2: Use the gel composition after applying the cream Referring to Table 4, the gel composition according to Preparation Example 1 exhibited excellent adhesive strength, when used alone and also, when subsequently after using the cream, compared with Reference Example 1 and Comparative Preparation Example 2. Particularly, Preparation Example 1 and Reference Example 1 turned out to be more suitable for the layering cosmetic method than Comparative Preparation Example 2.

Evaluation 4: Skin Moisture Increase Rate

The mask sheet according to Example 1 was attached to the skin for 24 hours right after manufactured and then, peeled off, and a moisture increase rate of the skin was continuously measured further for 6 hours by using a skin characteristic measurement analyzer (Miravex. Ireland), and the results are shown in FIG. 5.

Figure 5:
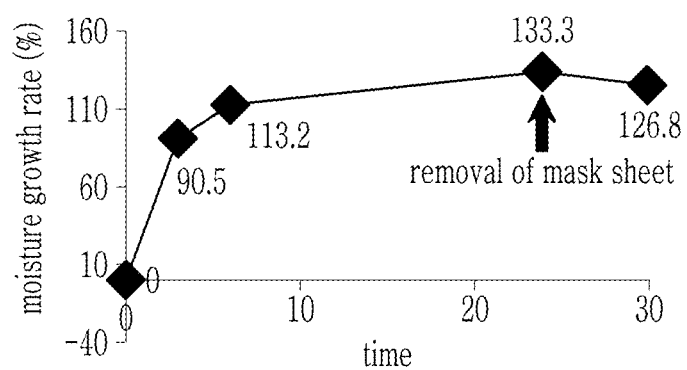
FIG. 5 is a graph showing the moisture increase rate of the skin area to which the mask sheet is attached, from the time the mask sheet according to Example 1 is attached to the skin until 6 hours after the removal of the mask sheet.

Referring to FIG. 5, the mask sheet according to an embodiment exhibited a moisture increase rate of 113%, when attached for 6 hours, and a moisture increase rate of 133%, when attached for 24 hours, and even after peeled off, moisturizing power was maintained during the daytime (for 6 hours).

Evaluation 5: Drying Loss Test

The mask sheets according to Example 1 and Comparative Example 3 were respectively processed to have a thickness of 1 mm and cut into a size of 5 cm×5 cm, and then stored in a drying oven at 45° C. for 60 minutes. From the weights of the processed gels before putting in the drying oven, lost weights after being stored for 10 minutes, lost weights after being stored for 20 minutes, lost weights after being stored for 30 minutes, lost weights after being stored for 40 minutes, lost weights after being stored for 50 minutes, and lost weights after being stored for 60 minutes were respectively measured, and the results are shown in Table 5 and FIG. 6. In addition, values according to Equation 1 were calculated and are shown in Table 5.

74% weight loss from the initial weight after 60 minutes. Accordingly, the mask sheet including the gel composition according to an embodiment maintained the initial adhesive strength.

Evaluation 6: Wrinkle Improvement Test

A mask sheet was manufactured by adding 0.05 wt % of oleanonic acid, a wrinkle functional component, based on 100 wt % of the composition according to Preparation Example 1 to prepare a composition (liquid) with viscosity and then, uniformly applying the composition on a releasing film and heating and cooling down the applied component, and applying a support on the other side to which the release film was not attached.

The mask sheet was cut into a neckband shape and used for two groups (test group 1 and test group 2) to evaluate wrinkle improvement clinical efficacy. The wrinkle improvement clinical efficacy evaluation was performed in the following method, and the results are shown in Table 6 and FIG. 13 to FIG. 16.

[Evaluation Group]
  Test group 1: Neckband
  Test group 2: Adenosine 0.04% essence+neckband

[Evaluation Methods]
  1) Test subjects: 10 men and women in the 20s to 40s
  2) Test: before use/after 2 weeks of use
  3) Test site: neck
  4) Products used: Neckband, Neckband+Essence
  5) Test item: Wrinkle
  6) Test method: After wiping the neck with a makeup remover wipe and waiting for 15 minutes at constant temperature and humidity, the measurement was performed.
  7) How to use the sample—a group (Test Group 1) where 5 people used the sample only as a neckband and another group (Test Group 2) where 5 people used the sample as a neckband with an essence containing 0.04% of adenosine were respectively instructed to apply the sample on the neck before bedtime and remove it in the next morning (every day for 2 weeks).
  8) Measuring Equipment: Primos lite (measured neck skin roughness ($R_a$) to evaluate whether or not neck wrinkles were improved)

As shown in Table 6, Test Group 2 who used the neckband with the adenosine 0.04% essence, compared with Test

TABLE 5

| | (unit: g) | | | | | | | |
|---|---|---|---|---|---|---|---|---|
| | | Evaporated (loss) weight | | | | | | |
| | Immediately before storage | Immediately after storage for 10 minutes | Immediately after storage for 20 minutes | Immediately after storage for 30 minutes | Immediately after storage for 40 minutes | Immediately after storage for 50 minutes | Immediately after storage for 60 minutes | Value according to Equation 1 |
| Example 1 | 0 | 2.2 | 2.7 | 3.1 | 3.1 | 3.6 | 4.5 | 4.5 |
| Comparative Example 3 | 0 | 10.3 | 27.6 | 42.2 | 54.5 | 62.1 | 73.7 | 73.7 |

Figure 6:
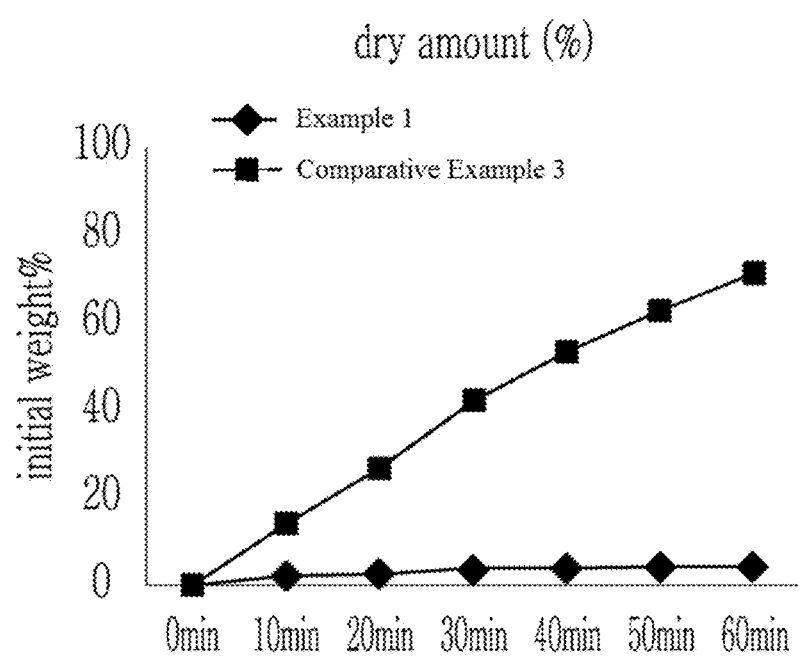
FIG. 6 is a graph showing the drying loss test results of the mask sheet specimen of Example 1 and the hydrogel mask sheet of Comparative Example 3, respectively.

Referring to Table 5 and FIG. 6, the gel composition according to an embodiment and a mask sheet including the same exhibited no weight change after 60 minutes but the hydrogel composition of Comparative Example 3 exhibited Group 1 who used the neckband alone, exhibited a significant neck wrinkle decrease for the 2 weeks, and accordingly, the mask sheet according to an embodiment turned out to be very suitable for the layering cosmetic method.

TABLE 6

|  | Test Group 1 | Test Group 2 |
|---|---|---|
| Before use ($R_a$; μm) | 41.32 | 33.60 |
| After 2 weeks of use ($R_a$; μm) | 38.26 | 27.04 |
| Neck wrinkle reduction rate (%) | 7.40 | 19.52 |

Evaluation 7: Blue Light Blocking Test

Figure 7:
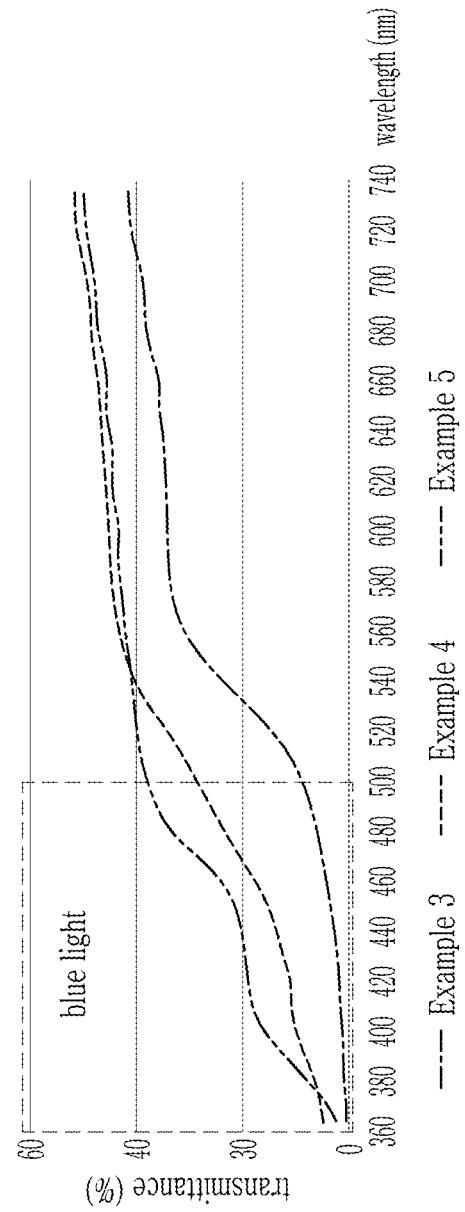
FIG. 7 is a graph showing the blue light transmittance of Examples 3 to 5.

The mask sheets according to Examples 3 to 5 were processed to have a thickness of 1 mm and respectively cut into a size of 5 cm×5 cm, and then, transmittance of the mask sheets was measured to examine blue light-blocking performance, and the results are shown in FIG. 7.

Referring to FIG. 7, the mask sheets according to Examples 3 to 5 exhibited excellent blue light-blocking performance.

Figure 8:
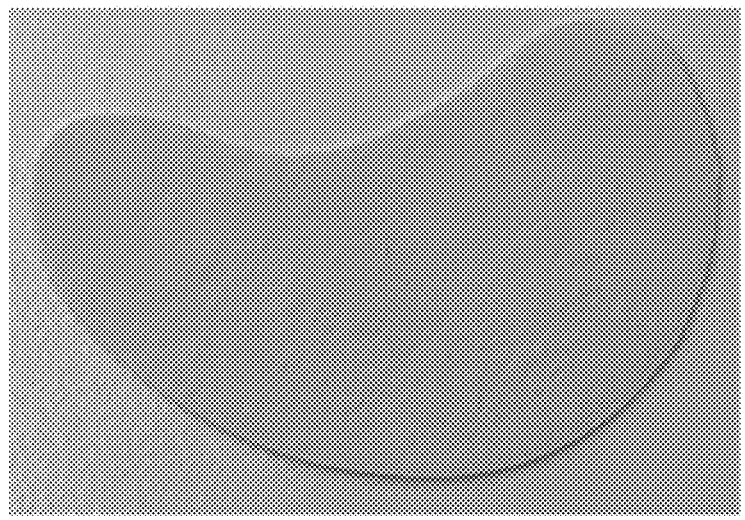
FIG. 8 is a view illustrating a shape of an eye mask according to the example.
Figure 9:
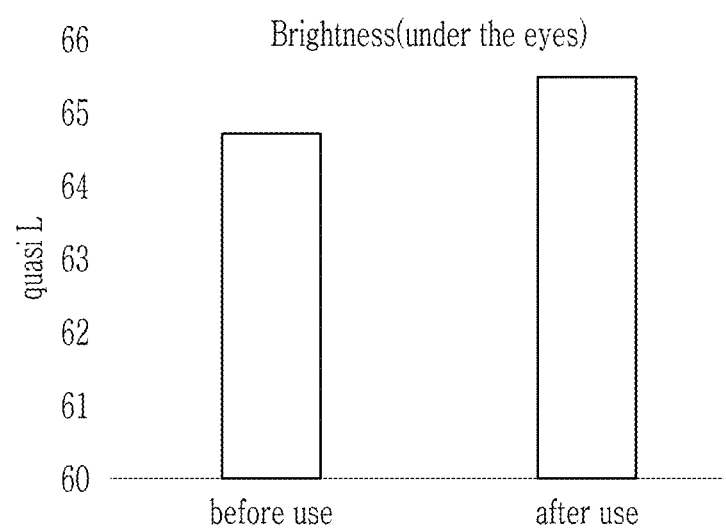
FIG. 9 is a graph illustrating a change in brightness under the eyes before and after using the eye mask according to the example. (quasi L stands for brightness grade, and has a value between 0 and 100 for black, and a higher value means closer to white)
Figure 10:
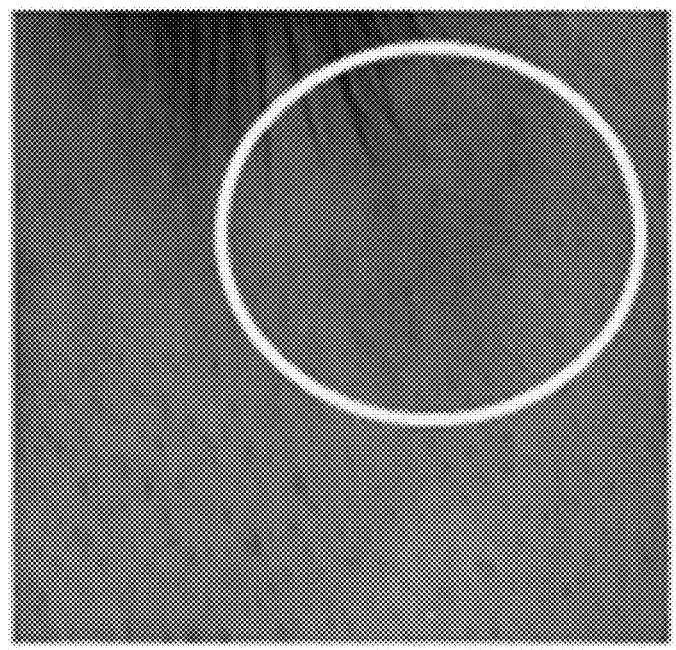
FIGS. 10 and 11 are each independently photographs showing changes in brightness under the eyes before and after using the eye mask according to the example.
Figure 11:
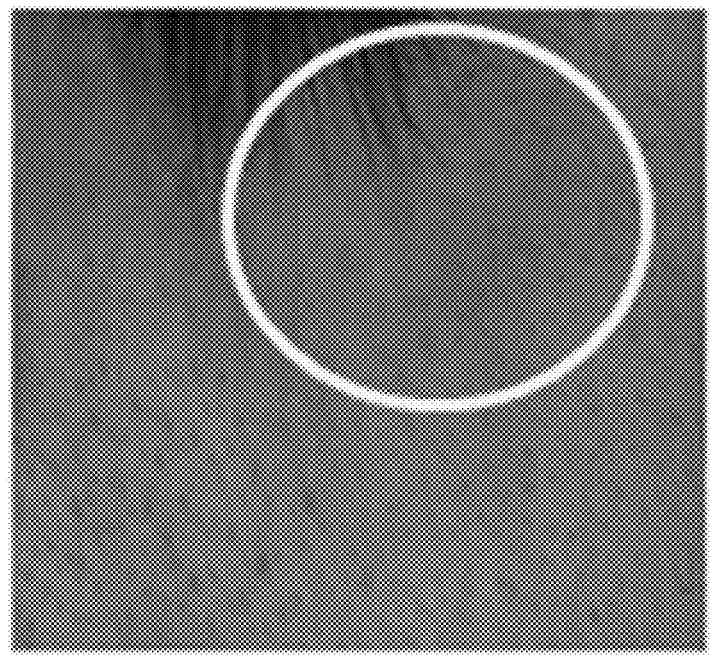
Figure 12:
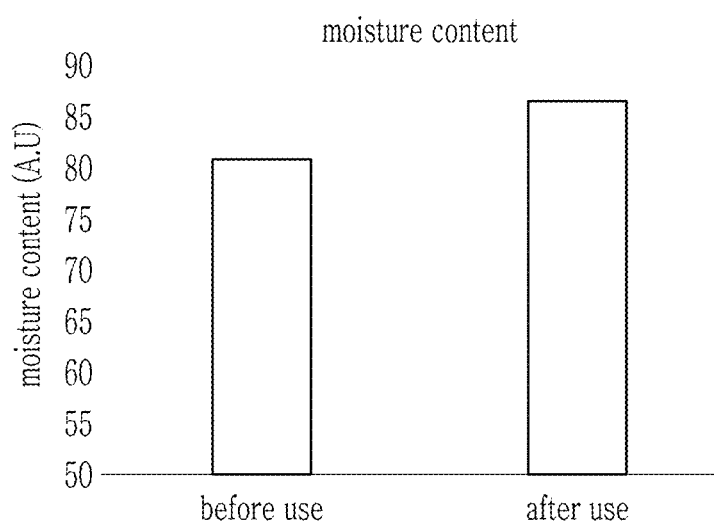
FIG. 12 is a graph showing a change of the moisture amount under the eyes before and after using the eye mask according to the example.
Figure 13:
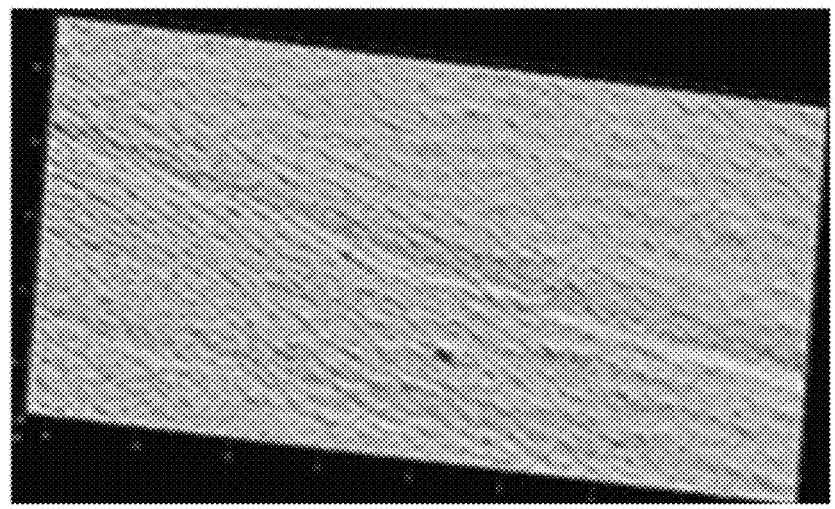
FIGS. 13 and 14 are photographs before and 2 weeks after application of the essence and the mask sheet according to the example to the neck, respectively.
Figure 14:
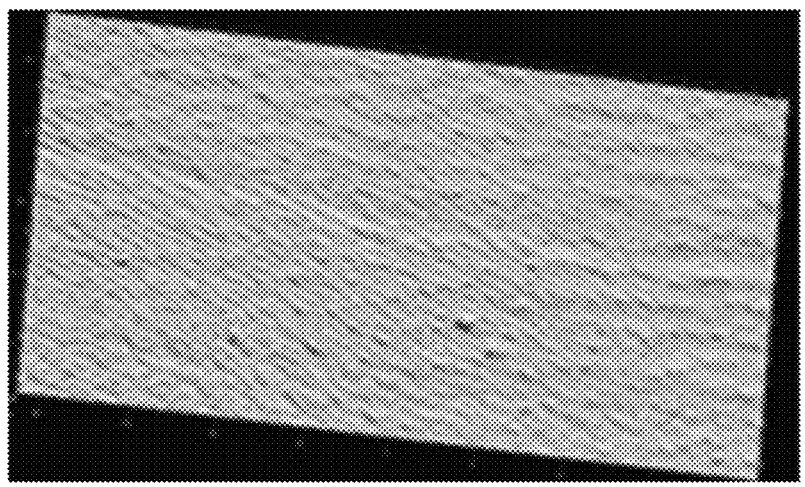
Figure 15:
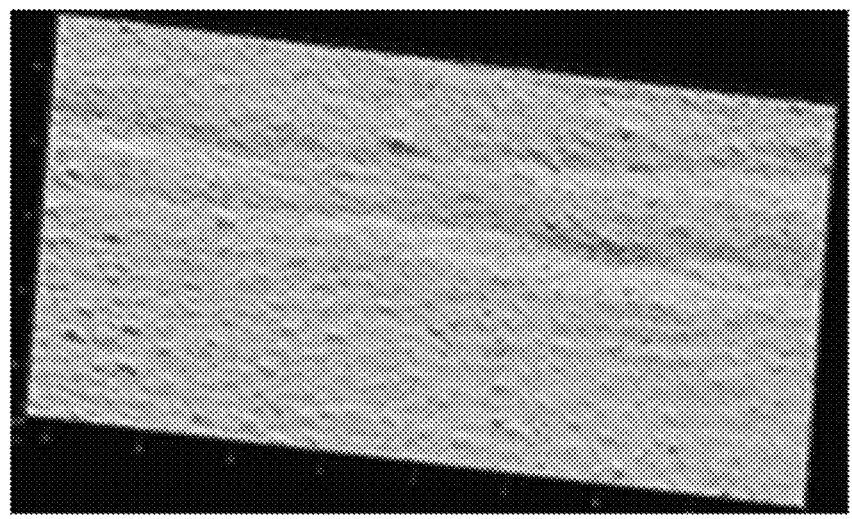
FIGS. 15 and 16 are photographs before and 2 weeks after application of the mask sheet according to the example to the neck, respectively.
Figure 16:
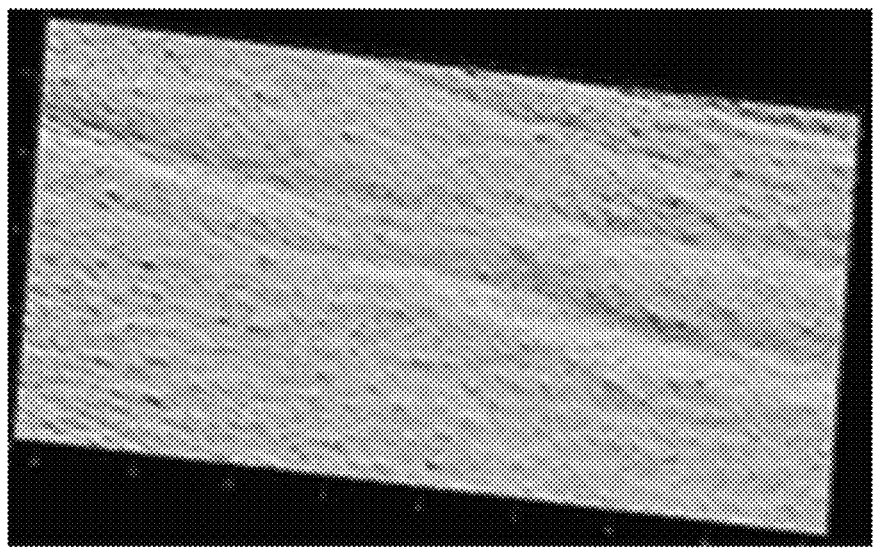

Evaluation 7: Test for Improvement of Darkening Under Eyes and Moisture Increase Rate The mask sheet of Example 3 was processed to have a thickness of 1 mm and a shape shown in FIG. 8 (processed into an eye mask), and after measuring brightness under the eyes and moisture contents of 10 test subjects in the 20s to 30s, the brightness under the eyes and moisture contents were measured again after the 10 test subjects went to bed with the eye mask under the eyes and removed it at 10 am the next day, and the results are shown in FIGS. 9 to 12.

Referring to FIGS. 9 to 12, the eye mask according to Example 3 had an effect of improving darkening under the eyes and furthermore a moisturizing effect due to an increased moisture content.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A sheet mask gel composition for blocking blue light, comprising
(i) an emulsion composition,
(ii) a polyol,
(iii) a thickener,
(iv) an inorganic material, and
(v) whitening material,
wherein the whitening material (v) includes niacinamide, wherein
the polyol (ii) is included in an amount of about 49 wt % to about 90 wt %,
the emulsion composition (i) is included in an amount of about 5 wt % to about 50 wt %, the thickener (iii) is included in an amount of about 1 wt % to about 10 wt %, and the niacinamide is included in an amount of about 0.01 wt % to about 4.0 wt %, each based on a total amount of the sheet mask gel composition,
wherein the emulsion composition (i) comprises (a) a butter, a wax, or a combination thereof, (b) an oil, (c) a surfactant, and (d) a polyol,
wherein the emulsion composition (i), when diluted in water, comprises particles having an average particle diameter of about 300 nm to about 400 nm,
wherein the inorganic material (iv) is water-dispersed titania in an amount of 0.7 wt % to 2 wt %, based on a total amount of the sheet mask gel composition, and
wherein the sheet mask gel composition blocks blue light and the sheet mask gel composition has an adhesive strength of greater than or equal to about 30 g/cm².

2. The sheet mask gel composition of claim 1, wherein the surfactant (c) comprises lecithin.

3. The sheet mask gel composition of claim 2, wherein the emulsion composition (i) further comprises an aliphatic alcohol having 16 or 18 to 22 carbon atoms.

4. The sheet mask gel composition of claim 3, wherein the emulsion composition (i) further comprises cetearyl alcohol, behenyl alcohol, or a combination thereof in addition to lecithin.

5. The sheet mask gel composition of claim 1, wherein the oil (b) comprises one or more selected from the group consisting of an ester oil, a hydrocarbon oil, and a silicone oil.

6. The sheet mask gel composition of claim 1, wherein the polyol (d) is included in an amount of about 50 wt % to about 80 wt %, and
a sum of the butter, the wax, or the combination thereof (a) and the oil (b) is included in an amount of about 1 wt % to about 40 wt %, and
the surfactant (c) is included in an amount of about 0.1 wt % to about 20 wt %,
based on a total amount of the emulsion composition (i).

7. The sheet mask gel composition of claim 6, wherein the sum of the butter, the wax, or the combination thereof (a) and the oil (b) is included in an amount greater than that of the surfactant (c).

8. The sheet mask gel composition of claim 1, wherein the emulsion composition (i) has a lamellar structure.

9. The sheet mask gel composition of claim 1, wherein the emulsion composition (i) is included in an amount greater than that of the thickener (iii).

10. The sheet mask gel composition of claim 1, wherein the polyol (ii) and the polyol (d) each comprise glycerin, 1,3-butanediol, propylene glycol, polyethylene glycol, dipropylene glycol, propanediol, or a combination thereof, and
the thickener (iii) comprises xanthan gum, hyaluronic acid, carboxymethylcellulose, polyacrylate carboxymethyl starch, carboxymethyl chitosan, carboxymethyl dextran, or a combination thereof.

11. The sheet mask gel composition of claim 1, wherein the sheet mask gel composition satisfies Equation 1:

$$100-(B/A\times100)<10 \qquad \text{[Equation 1]}$$

wherein, A is a weight of a gel, obtained by gelling the sheet mask gel composition, immediately after cutting the gel to a gel piece of 5 cm×5 cm×1 mm, and
B is a weight of the gel piece immediately after drying the gel piece at 45° C. for 60 minutes.

12. The sheet mask gel composition of claim 1, wherein the sheet mask gel composition has a higher adhesive strength to a skin on which a water-soluble or oil-soluble composition has been applied, than adhesive strength to a clean skin free of the water-soluble or oil-soluble composition, when measured under same conditions.

13. A mask sheet comprising the sheet mask gel composition of claim 1.

* * * * *